United States Patent [19]

Beisswenger et al.

[11] Patent Number: 4,716,856
[45] Date of Patent: Jan. 5, 1988

[54] INTEGRAL FLUIDIZED BED HEAT EXCHANGER IN AN ENERGY PRODUCING PLANT

[75] Inventors: Hans Beisswenger, Montvale, N.J.; Wolfgang P. Frank, Eschborn, Fed. Rep. of Germany; Alexander T. Wechsler, Riverdale, N.Y.

[73] Assignee: Metallgesellschaft AG, Frankfurt am Main, Fed. Rep. of Germany

[21] Appl. No.: 898,789

[22] Filed: Aug. 18, 1986

Related U.S. Application Data

[63] Continuation of Ser. No. 744,118, Jun. 12, 1985, abandoned.

[51] Int. Cl.$^4$ .............................................. F22B 1/00
[52] U.S. Cl. ................................. 122/4 D; 110/245; 165/104.16
[58] Field of Search ................ 122/4 D; 165/104.16; 110/245, 347; 431/7, 170

[56] References Cited

U.S. PATENT DOCUMENTS

| | | | |
|---|---|---|---|
| 3,859,963 | 1/1975 | Roberts et al. | 122/4 D |
| 4,165,717 | 8/1979 | Reh et al. | 122/4 D |
| 4,312,301 | 1/1982 | Anson | 122/4 D |
| 4,457,289 | 7/1984 | Korenberg | 122/4 D |
| 4,473,032 | 9/1984 | Maintok | 122/4 D |
| 4,552,203 | 11/1985 | Chrysastome et al. | 122/4 D X |

Primary Examiner—Edward G. Favors
Attorney, Agent, or Firm—Felfe & Lynch

[57] ABSTRACT

Disclosed is an apparatus and process for an energy producing plant utilizing a circulating fluidized bed system having an integral fluidized bed heat exchanger, the fluidized bed reactor and integral heat exchanger having a common wall with at least one perforation for fluid communication therebetween. In the system, solids are separated from the reactor flue gas, and in dependence upon a process variable, are directed in varying amounts either directly back into the reactor or into the integral heat exchanger, the latter being operated as a classical and/or bubbling bed at a higher pressure than the reactor. A heat exchange medium passes through tube bundles immersed in the exchanger fluid bed and the bed solids and fluidizing gas in the heat exchanger are passed through the perforation to control the reactor operation. Because of its structural integrity this system allows for greater flexibility in control and aids in turndown operations as well as controlling variations experienced under otherwise constant load conditions. The system and arrangement find use both in utility plants and process operations.

24 Claims, 9 Drawing Figures

INTEGRAL FLUIDIZED BED HEAT EXCHANGER IN AN ENERGY PRODUCING PLANT

This application is a continuation, of application Ser. No. 744,118, filed June 12, 1985, abandoned.

The present invention is in an improved circulating fluidized bed apparatus and system providing improved versatility.

Circulating fluidized bed technology, and in particular, combustion processes employing such technology, have proved to provide significant advantages over the classical and/or bubbling type fluidized bed. The basic circulating fluidized bed process and apparatus for combustion of carbonaceous material is disclosed and claimed in U.S. Pat. No. 4,165,717 to Reh, et al.

Reh et al disclose techniques for handling the solid products of combustion. Hot solids discharged from the circulation system are cooled in an external and separate fluidized bed cooler when the content of the incombustibles is high. An improved system heat balance is obtained if the hot solids traverse a plurality of serially aligned chambers in the external fluidized bed cooler as does the fluidizing gas therein. The heated fluidizing gas exhausted from the fluidized bed cooler can serve as secondary gas in the fluid bed reactor so that a part of the heat content of the solids is transferred back into the combustion process. Heat is transferred not only to the fluidizing media but to the cooling media which may serve as primary gas. The cooled solids from the fluidized bed cooler are transferred to a storage bin for additional processing and/or disposal.

U.S Pat. No. 4,111,158 discloses a circulating fluidized bed system wherein hot solids withdrawn from the circulation system are cooled by direct and indirect heat exchange in an external and separate fluidized bed cooler. At least a part of the cooled solids from the external fluidized bed cooler are recycled to the fluidized bed reactor to maintain a predetermined constant reaction temperature therein. The hot fluidizing gas from the solids cooler is fed into the reactor as secondary air.

While each of the fluidized bed cooler arrangements described above provides an improved heat balance and a degree of control over the process, the versatility and response time of the systems have limitations. These limitations are a drawback as new demands are made on energy generation such as in cogeneration and other systems.

U.S. Pat. No. 4,473,032 discloses an arrangement in turbulent type combustors wherein the heating surface is distributed in a number of different units to provide control for low load level conditions. Disclosed therein is a circulating fluidized bed reactor with external and separate "flow-bed carriers" having evaporative surfaces. At high load condition, solids collected from the turbulent type combustion chamber are increasingly cycled to the flow bed cooler. This provides inefficient control over bed temperature thus sacrificing certain benefits of CFB technology.

One area where circulating fluidized bed technology is a significant advance is in utility plant applications. Control requirements in this field are just as important as in process steam generation.

In utility plant applications, the present practice is that super heat is controlled by desuperheating by introducing a water spray into the superheated steam. The amount of water introduced can effect the turbine operation as well as the turbine.

U.S. Pat. No. 4,312,301 discloses an entrained bed combustor system wherein hot solids captured from the exhaust gas of the fluidized bed are distributed to generate and superheat steam. The steam generator 17 is remote from the combustor 10. Steam is superheated in unit 18 and then passes into a turbine 25.

The techniques disclosed therein teach parallel operation of a steam generator with a superheater and reheater. Here again, certain of the most beneficial aspects of CFB technology are sacrificed.

SUMMARY OF INVENTION

The limitations of the prior art are largely overcome and improved versatility is obtained by an improved apparatus and process of the present invention whereby one obtains an improved ability to control the operation of the system while achieving a shorter system response time. Unavoidable system variations are controlled as well as an improved control over system changes such as load turndown. The system provides additional versatility without sacrifice of the advantages of circulating fluidized bed technology.

A circulating fluidized bed system is generally understood to include a fluidized bed reactor, at least one solids separator and recycle leg capable of recirculating solids collected in the separator back into the reactor.

In a typical process of the present invention, carbonaceous fuel is burned to provide steam by introducing the fuel into a fluid bed in an upright reactor combustor wherein the material is fluidized by a primary gas introduced at the bottom of the bed. Secondary gas is introduced at a level above that of the primary gas and contains oxygen. Carbonaceous material is burned with the oxygen. The fuel and oxygen are maintained in the bed at distinct proportions.

Whereas in a classical and/or bubbling fluidized bed, a dense phase is separated by a sudden change in density from the overlying gas space, the circulating fluidized bed exhibits states of distribution which are not defined by a distinct boundary layer. There is no sudden change in density between a dense phase and an overlying gas space, and the solids concentration in the reactor decreases continuously from bottom to top, i.e., the fluidized bed is an expanded fluidized bed.

When Froude's number and Archimedes' number are used to define the operating conditions, the following ranges can be determined:

$$0.1 < \frac{3}{4} \times \frac{u^2}{g \times d_k} \times \frac{\rho_g}{\rho_k} < 10$$

and $$0.01 < Ar < 100$$

$$Ar = \frac{d_k^3 \times g(\rho_k - \rho_g)}{\rho_g \times v^2}$$

wherein:
u = relative gas velocity in m/sec.
Ar = Archimedes' number
$\rho_g$ = density of gas in kg/m$^3$
$\rho_k$ = density of solid particle in kg/m$^3$
$d_k$ = diameter of spherical particles in m
v = kinematic viscosity in m$^2$/sec.
g = constant of gravitation in m/sec.$^2$ The thermal energy resulting from the combustion of the fuel can be removed in part from the fluid bed by contacting cooling surfaces located above the secondary gas inlet with fluid bed solids. That level below the secondary gas inlet where the fuel is introduced is free from obstructions. The solids laden exhaust gas from the reactor is ducted to a solids separator wherein the solids are separated and recycled to a lower portion of the fluid bed through a recirculation leg. Excess solids are removed from the circuit. In the invention, one can use more than one solids separators for collection and distribution of the collected hot solids. Certain applications may be advantageously conducted wherein minimum amounts of thermal energy are removed in the combustor. Other applications exist where it is highly beneficial to extract the larger portion of the heat in an external fluidized bed heat exchanger.

In a circulating fluidized bed system according to the present invention, means are provided such that at least a portion of solids separated from the reactor flue gas in the separator are reintroduced into a fluidized bed heat exchanger which is integral to the fluidized bed reactor. The apparatus and system are adapted so that at least a portion of the solids separated from the reactor flue gas is recycled into the fluidized reactor. The arrangement is formed with a perforated spacer wall between the reactor interior and integral fluidized bed heat exchanger. The one or more perforations are sized to allow solids and gas within the heat exchanger to pass into the reactor. The gas and solids introduced into the reactor via the fluidized bed heat exchanger aid in controlling reaction temperature and provide increased versatility, control and responsiveness to the system. The integral fluidized bed heat exchanger is preferably positioned between the respective reactor inlets for primary and secondary gas. Its integral housing may be formed as a bent section of the inner combustion chamber wall and/or can be refractory lined. The perforation(s) of the wall is preferably at or above the level at which the coal is fed into the reactor while the lower section of the perforation is at about the level of the bed in the heat exchanger. The perforation can thus act as an overflow weir for solids flow from the heat exchanger to the reactor.

The fluid bed heat exchanger has at least one bundle of heat exchange tubes which is positioned so as to be substantially if not entirely immersed in the heat exchanger bed. The heat exchanger wall may be formed of a wall tube construction.

Water, air, steam for super heat or reheating, or molten salt can be used as a heat exchange fluid in the fluidized bed heat exchanger tubes and/or wall tubes. Process air, or at least a portion thereof, such as secondary air, may be heated in the tubes.

The fluidizing gas in the external fluidized bed heat exchanger is at a low flow rate so that the heat exchanger operates as a conventional or bubbling fluidized bed. The fluidizing gas in the heat exchanger is at higher pressure than the pressure in the fluid bed reactor at the location where the heat exchanger gas is introduced so virtually no solids or gas flows from the reactor into the heat exchanger, but rather, the flow of solids into the reactor results in part from a differential pressure between the fluidizing gas within the heat exchanger and the reactor chamber. The perforation lower lip area acts as an overflow weir additionally allowing solids to flow into the reactor. Excess solids may be discharged from the heat exchanger for further processing after which they are led to an ash silo.

The solids bleed off rate from the circulating solids separator into the heat exchanger and/or reactor is controlled based on the temperature of the separator exhaust gas and/or by the exit temperature of the fluid in the tubes of the heat exchanger. If the exhaust temperature rises, a greater proportion of solids is then directed to the heat exchanger. If the solids separator exhaust gas temperature drops, recycled solids are proportionately increased directly into the reactor to adjust the temperature therein.

The arrangement of the integral combustor and fluidized bed heat exchanger allows for improved independent control of a number of heat duty requirements. For instance, independent control of super heat and reheat duty as well as evaporative, super heat and reheat duties is obtainable with minimum response time.

A feature of the present invention is that the combustion process can be carried out at high throughput rates and at a highly constant temperature. This is of considerable importance in the combustion of carbonaceous materials in view of the formation of nitrogen oxides ($NO_x$) and also of the behavior of the ash.

A constant temperature can be maintained solely by the controlled recycling of the cooled solids, i.e., without a need for a change of the operating conditions in the fluidized bed reactor, e.g., without a change of the density of the suspension and a change of other variables.

The process according to the invention permits an adjustment of the combustion temperature from very low temperatures, which are only slightly above the ignition limit, to very high temperatures, which are close to an upper limit defined by the softening of the combustion residue or of any inert fluidized solids if inert bed material is used. In practice, the combustion temperature lies in a range from about 450° C. to 1200° C.

A special advantage afforded by the invention resides in that a highly constant temperature and a combustion under approximately stoichiometric conditions are enabled even at relatively low combustion temperatures, which are desirable for various reasons.

Because the heat generated by the combustion of the combustible component may be partially extracted (recovered) in the fluidized bed heat exchanger, which succeeds the fluidized bed reactor in the solids flow path, heat transfer to the reactor cooling registers is of less significance. Such heat transfer would require a high density of the suspension. For this reason the method affords the additional advantage that a low density of the suspension is permissible in the fluidized bed reactor above the secondary gas inlet so that the total pressure drop in the fluidized bed reactor is reduced.

Heat is recovered in the integral fluidized bed heat exchanger under conditions which result in an extremely high coefficient of heat transfer, e.g., in the range from 350 to 500 Watts/m$^{2\circ}$ C. This is due to the fact that the fluidized bed heat exchanger can be operated under optimum conditions.

The method according to the invention is free from detrimental influences which are due to afterburning, overheating, corrosion, etc., which would otherwise have to be taken into account if the heat exchanger were effected in the combustion reactor, as is customary.

The combustion in the reactor is effected in two or more stages because the oxygen-containing gas required for the combustion of the combustible constituents of the fed material is fed in two or more partial streams on different levels. This results in a progressive weak combustion, which involves no local overheating so that very low amounts of nitrogen oxides are generated. Hence, the gases can be directly released into the atmosphere without treatment to reduce the $NO_x$ content.

Because the lower part of the reactor space, disposed below the secondary gas inlet, is substantially free of internal fixtures, the feed which has entered the reactor is effectively distributed instantaneously. The rapid mixing with the hot bed solids ensures also a good ignition.

The gas velocities in the fluidized bed reactor above the secondary gas inlet are usually above 5 m/sec. and may be as high as 15 m/sec. if the operation is at atmospheric pressure.

The fluidized bed reactor should be dimensioned so that gas residence times of 0.5 to 8.0 seconds, preferably 1 to 4 seconds, are obtained.

The fluidizing gas in the reactor and/or heat exchanger can consist virtually of any desired gas which will not adversely affect the properties of the exhaust gas. Suitable fluidizing gases include inert gases, such as recycled flue gas (exhaust gas), nitrogen, and water vapor. To intensify the combustion process it is desirable to feed a partial stream of the oxygen-containing gases required in the fluidized bed reactor as fluidizing gas to said reactor.

It is apparent that the method can be carried out in either of the following modes:

1. An inert fluidizing gas is used for the reactor and fluid bed heater. In this case the oxygen-containing combustion gas must be fed as secondary gas on at least two superimposed levels.

2. Oxygen-containing fluidized gas is used for the reactor and fluid bed heat exchanger. In this case, secondary gas may be fed on a single level although the secondary gas may be fed on a plurality of levels in this mode also. In this mode the fluidizing gas of the fluid bed heat exchanger can serve totally or partially as secondary gas.

3. Oxygen containing gas is used for the reactor and an inert gas is used for the fluidization of the integral fluid bed heat exchanger. As in the case above, the secondary gas may be fed on a single level or on a plurality of levels.

A plurality of inlets for the secondary gas are desirably provided on each level at which secondary gas is fed.

According to a further preferred feature of the method according to the invention, the secondary gas is fed on a level which is spaced above the fluidizing gas inlet by a distance of up to 30% of the total height of the space of the fluidized bed reactor and at least by a distance of 1 m. If the secondary gas is fed on a plurality of levels, the above feature will be applicable to the level of the uppermost secondary gas inlet. The feeding at this level will provide a sufficiently large space for the first combustion stage so that the reaction between the combustible components and the oxygen-containing gas, which may be fed as fluidizing gas or as secondary gas on a lower level, and the combustible component is almost completed in said stage, and a sufficiently large final combustion zone can be provided in the upper portion of the reactor space above the secondary gas inlet.

The wall of the fluidized bed reactor may be provided with cooling surfaces. Cooling surfaces may also be provided in the free space of the reactor (above the secondary inlet) but are of minor significance and may be omitted in certain cases, e.g., where fuels are employed which have low calorific values or which generate erosive ash.

When sulfur containing carbonaceous materials are burned, it is desirable to minimize the sulfur content of the exhaust gas. This can be accomplished in that the combustion process is carried out in the presence of fine-grained desulfurizing agents, such as limestone, lime, dolomite, and the like. The desulfurizing agents should have a mean particle diameter of e.g., 30 to 500 microns and may simply be fed together with the fuel. The constant temperature which is ensured by the method according to the invention is beneficial also for the desulfurization because the desulfurizing agent preserves its activity and its ability to combine with sulfur. This advantage is supplemented by the small particle size of the desulfurizing agent because the ratio of surface area to volume is particularly favorable for the sulfur-combining rate, which depends mainly on the diffusion velocity.

The output of a reactor having given dimensions can be increased in that, in accordance with a further preferred feature of the invention, the combustion process is not carried out with ordinary air but with air which has been enriched with oxygen and/or is under superatmospheric pressure, preferably up to 20 kg/cm$^2$ above atmospheric pressure.

The feed is supplied to the fluidized bed reactor in a conventional manner, suitably through one or more feed points or may be blown in pneumatically. The effective transverse mixing permits the use of relatively few feed points.

The process according to the invention is particularly suitable for the combustion of carbonaceous materials, i.e., of all kinds of coal, coal washery refuse, various industrial residues, oil shale, fuel oil, wood wastes, municipal refuse and mixtures thereof. If fuel oil or gaseous fuel is used as carbonaceous material, an auxiliary bed is required, which may consist, e.g., of fine-grained sand, limestone, lime, dolomite, or other mineral solids. Additional fields of application include the roasting of various sulfide ores or ore concentrates.

It has further been found that the inventive apparatus and process provides numerous other advantages, i.e., improved feed capability and fuel preconditioning can also be obtained and desuperheating by water spraying is significantly reduced.

The various features of novelty which characterize the invention are pointed out with particularity in the claim annexed to and forming a part of this specification. For a better understanding of the invention, its operating advantages and specific objects obtained by its use, reference should be had to the accompanying drawings and descriptive matter in which there is illustrated and described a preferred embodiment of the invention.

BRIEF DESCRIPTION OF THE DRAWINGS

FIG. 5(a–c) shows various arrangements for different heat duty requirements; and FIGS. 6A and 6B show arrangements with multiple solids separators and heat exchangers.

DESCRIPTION OF PREFERRED EMBODIMENT

Figure 1:
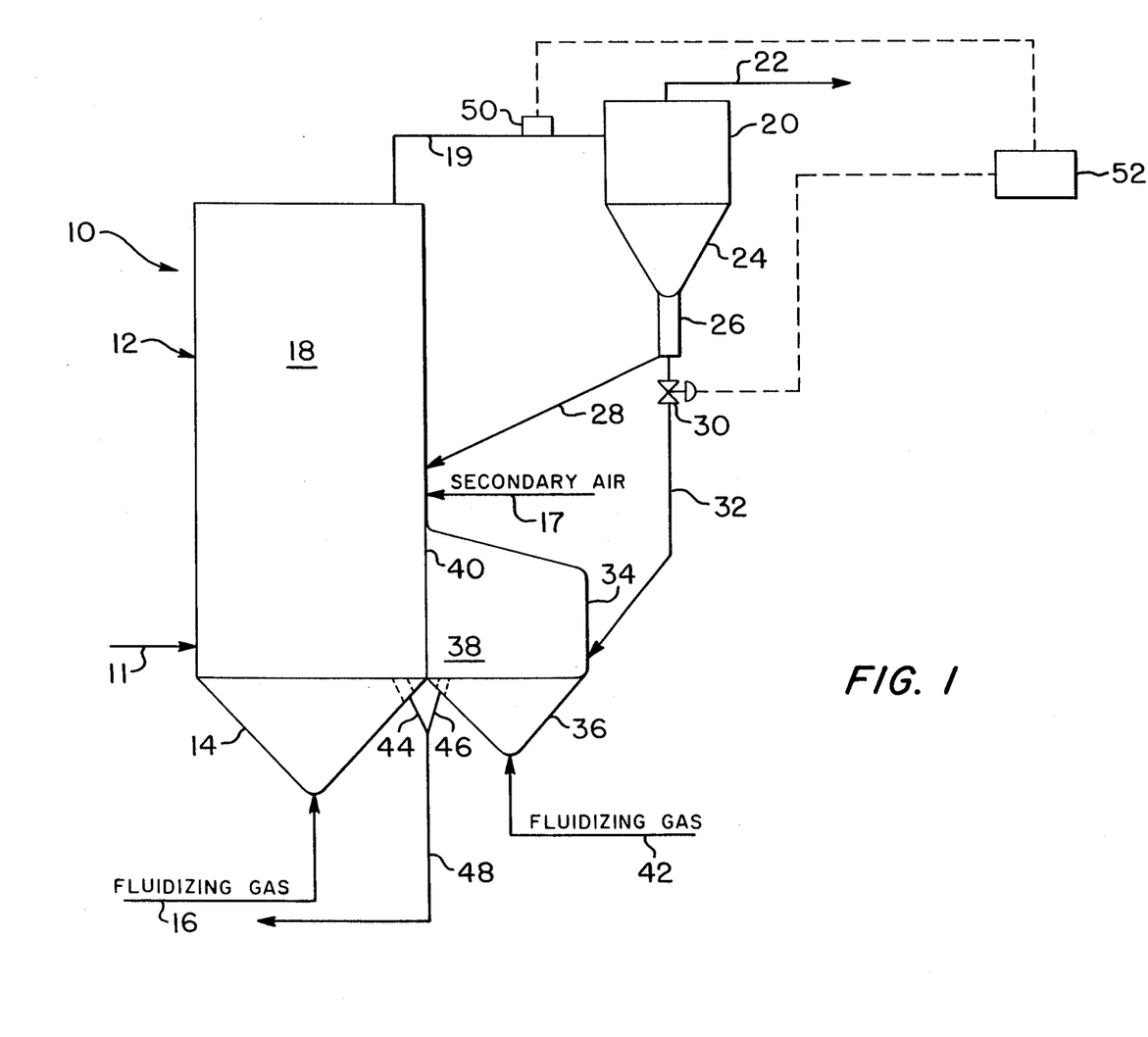
FIG. 1 schematically depicts an arrangement of the present invention.

Fluidized bed reactor 10 is preferably of a rectangular configuration and is formed of an elongated section 12 and a lower section 14. The method of construction of reactor 10 is not important as long as gas tight construction is maintained and it can endure the operating and service requirements expected of such an installation.

Carbonaceous fuel, such as coal, is introduced into the reactor 10 through line 11. Primary fluidizing gas is introduced by line 16 and is distributed by a conventional grate and nozzle arrangement known to those in the art. The fluidizing gas is introduced at a pressure $P_1$ wherein $P_1$ is greater than atmospheric. The fluidizing gas at pressure $P_1$ must be at a condition to overcome pressure losses sustained in the distributor assembly and through the rest of the flow path. The flow of fluidizing gas must be sufficient to fluidize and initially entrain the bed solids in the reactor. Secondary oxygen containing gas is introduced through line 17. The fluidized solids experience burning during the combustion step such that a substantial, if not all of the carbon content will be consumed to form products of combustion and other substances will be given off which may have been entrapped in the carbonaceous containing material. Therefore, the resulting solid particulate can be smaller than the initial fuel feed. In any case, in chamber 18 of upper section 12 above the secondary gas inlet there will be a gas-solid suspension having a mean suspension density in the order of 10 to 100 kg/m$^3$ but preferably between 15 and 50 kg/m$^3$. Methods for regulating this suspension are taught by Reh, et al., in U.S. Pat. Nos. 4,165,717 and 4,111,158.

The flue gas with entrained solids is exhausted at or near the top of reactor 10 through line 19 into a separating cyclone 20 wherein the entrained solids are separated from the flue gas by centrifugal action. In practice the separating system may comprise more than one separating cyclone each handling a portion of the solids laden reactor exhaust gas. The solids in cyclone 20 fall into its lower cone 24, the outlet of which feeds into a valve 26 such as a mechanical or pneumatic seal to maintain proper flow direction of the gas and solid streams. The flue gas leaves cyclone 20 through line 22 and passes into a conventional convective steam generating section (not shown) which can contain economizing, evaporating super heat or reheat surfaces and is then introduced into other gas cleaning apparatus, such as a baghouse or an electrostatic precipitator (not shown) for further removal of any remaining fines. An air preheater can also be employed to partially recover the heat contained in the flue gas.

Valve 26 feeds into a recycle leg 28 which allows the collected solids to be reintroduced directly back into the reactor. Recycle leg 28 should be sized to accommodate recycle of all the collected solids. However, as explained below, depending on demand and operating conditions, one may not wish to recycle all or any of the solids directly back into the reactor through leg 28. Solids collected in separator 20 can be removed through a one way material valve 30 placed in a second leg 32. As subsequently explained, all solids collected in separator 20 can be removed through leg 28 or through second leg 32. The solids removed from the separator can be divided between legs 28 and 32. Various types of diverter valves (not shown) are available to accomplish the task.

An integral fluidizing bed heat exchanger 34 is formed from a bent portion of a wall of reactor 10 section 12. Heat exchanger 34 is fashioned with a lower section 36 and upper chamber 38. The upper chamber is adapted to receive solids from second leg 32, preferably at a lower section of the chamber 38 as will be subsequently described. The interior of reactor 10 and upper chamber 38 are each partially defined by spacer 40.

Fluidizing gas is introduced into lower section 36 through a grate-nozzle distributor assembly through line 42. The fluidizing gas in heat exchanger 34 is at a pressure P2 and enters the reactor 10 through perforation 56. Reactor 10 and lower section 36 each may have a drain, 44 and 46 respectively, for removal of solids through line 48 for disposal or further processing.

The amount of solids fed into heat exchanger 34 by leg 32 can be controlled based on a number of variables. In the preferred embodiment, the temperature of the flue gas exhausted from reactor 10, or as exhausted from separator 20 is sensed by thermocouple 50. The resulting signal is then transmitted to a temperature controller 52 for comparison to a preset temperature or temperature range. If the measurement falls outside the range or deviates from the preset point, a signal is sent to activate or deactivate valve 30, allowing collected solids to flow therethrough for feed into heat exchanger 34. If proportional control is used, based on previous calibration, the valve 30 can be automatically proportionately adjusted so that a necessary portion of the separated solids are fed into chamber 38. Of course, it will be appreciated that if the separating system contains an additional cyclone, additional system flexibility is available, i.e., recycle of solids collected in a first cyclone directly to the reactor while cycling collected solids from the second cyclone to chamber 38 to meet various heat duty requirements.

In those applications where the temperature of the heated medium at the exit of the heat exchanger 34 is to be controlled the temperature signal is used to control the solids flow from the recycle leg to the integral fluid bed heat exchanger. In this case combustion temperature can be controlled in other ways, for example, with a second integral fluid bed heat exchanger or as disclosed in U.S. Pat. No. 4,165,717.

Figure 2:
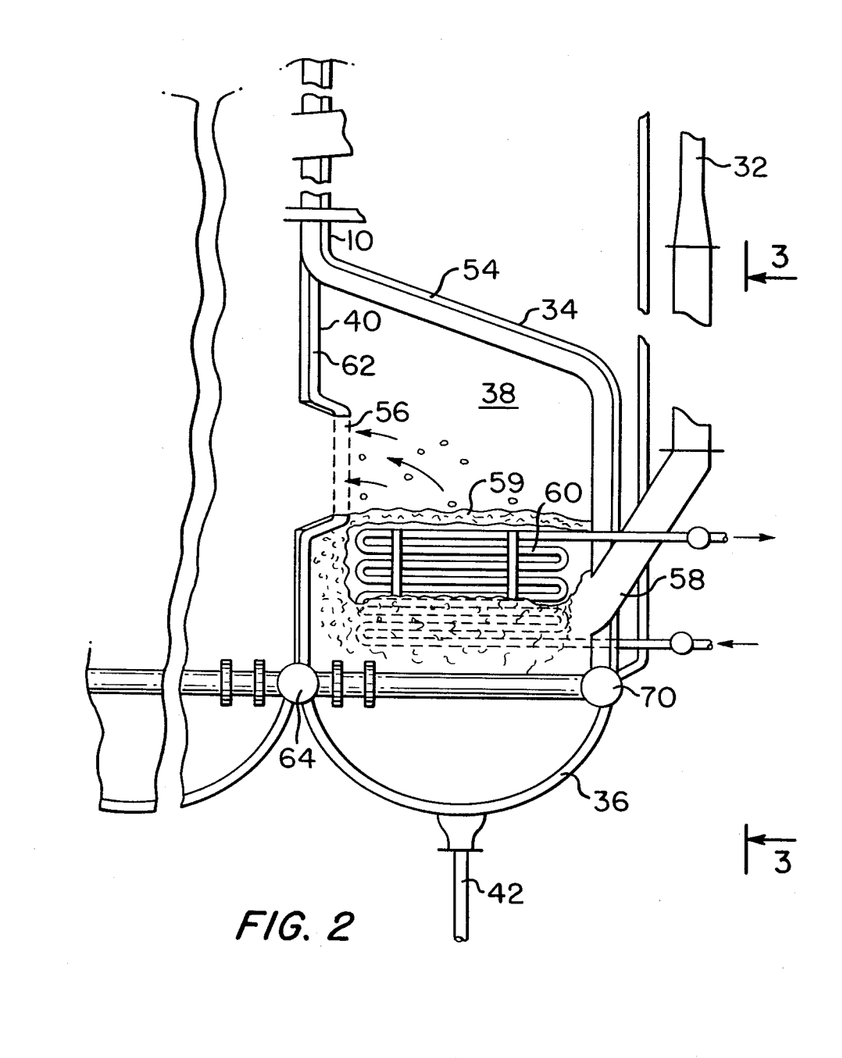
FIG. 2 is a cut away of an elevation view of a section of the reactor with the fluid bed heat exchanger.

Referring to FIG. 2, the heat exchanger 34 is preferably formed, at least in part, by a bent wall section 54 of reactor 10. Spacer 40 partially defines chamber 38 and the interior of reactor 10 where the reactor solids suspension is at its highest density. Spacer 40 is formed with at least one perforation, opening 56. The sizing of opening 56 will be described below. However, it is preferable that spacer 40 be formed with a plurality of perforations. In either instance, the criteria will be the same.

Referring to FIG. 2, a second recycle leg 32 is connected to a duct 58 which empties into the lower area of chamber 38. The solids cycled through leg 32 form a bed 59 of solids with a more or less definite boundary layer. This definite boundary layer is characteristic of classical or bubbling type fluidized beds.

Also housed within heat exchanger 34 is a bent heat transfer bundle 60 which is immersed in bed 59. The upper boundary of bed 59 is level with a lower boundary of the perforation(s) 56. The solids bed in chamber 38 can either be operated as a classical or bubbling bed and should not be operated at velocities or under conditions to cause substantial entrainment of the bed solids in chamber 38. The relationship between the pressures in chamber 38 and reactor 10 at the level of perforation(s) 56 is $P_2 > P_1$, so that no flow of gas or solids occurs directly from reactor 10 into chamber 38 through the perforations. Rather, perforation(s) 56 is (are) sized so that flow of gas and solids occurs from chamber 38 into reactor 10 and such flow into reactor 10 does not substantially interfere with the process therein. This requires sizing the perforation(s) and the fluidization gas system such that the heat exchanger gas pressure loss across it is such that the heat exchanger gas will be at substantially the pressure condition inside the reactor 10 at the point of introduction.

Spacer 40 may be formed from a tube wall construction 62 connected to a header 64.

Figure 3:
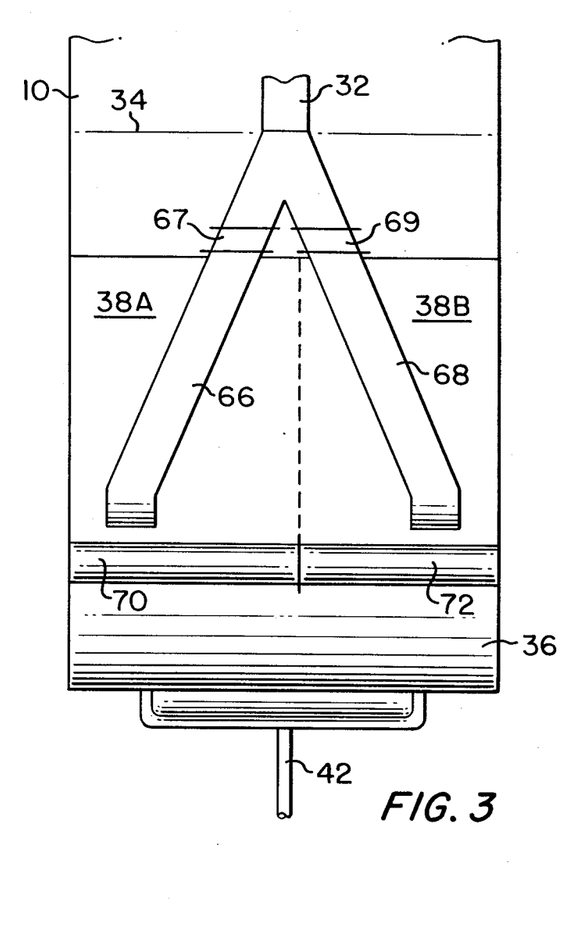
FIG. 3 is a view along line 3—3 of FIG. 2.

As shown in FIG. 3, recycle leg 32 is divided into two legs 66 and 68 and chamber 38 is subdivided into compartments 38A and 38B. Each leg 66 and 68 has a valve 67 and 69 respectively which can be independently operated. Each compartment houses a bundle of heat transfer tubes which receive a fluid and header pipes 70 and 72 respectively allowing independent heat duty to be accomplished in the respective compartments. Therefore, depending on system requirements, each compartment 38A and 38B can be used independently. For instance, compartment 38A may be used to effect evaporation while 38B can be used for superheat. Thus, the respective valves to the appropriate compartment can be manipulated to allow the required solids to pass therethrough to feed the appropriate compartment. The walls and partitions of the fluidized bed heat exchanger can be made out of tubes and can serve as heat transfer surfaces.

Other combinations are possible and, by the use of additional compartments, other types of heat duty can also be accomplished, such as reheat as in utility plant applications. The apparatus and process can be utilized in those applications calling for process steam or thermal duty, where evaporation and superheat are generally required, and in utility applications where superheat and reheat are required. Additionally, the apparatus and process can be adapted where superheat, reheat and evaporative duty are called for.

Figure 4:
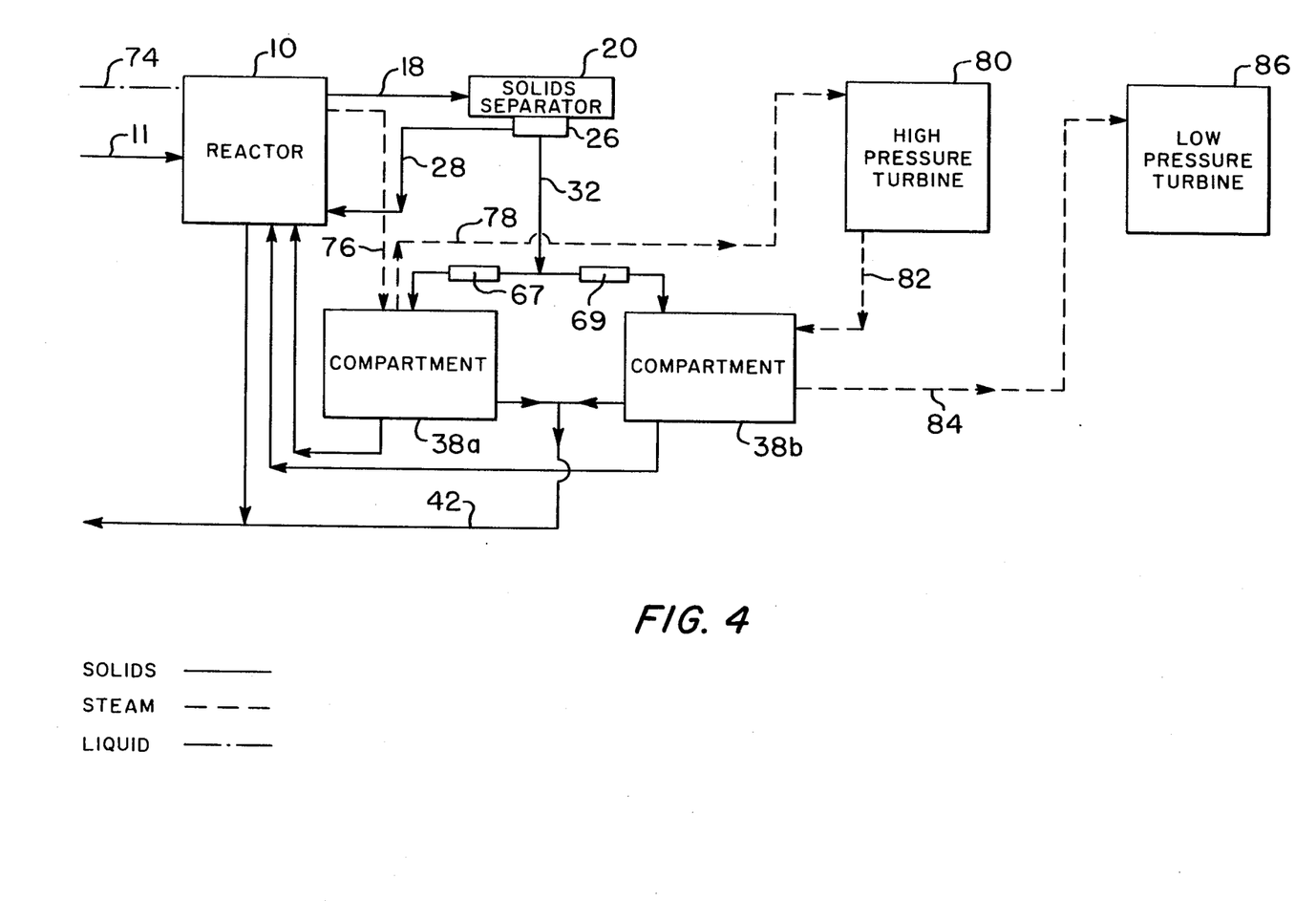
FIG. 4 schematically illustrates how the invention can be utilized in a power plant.

FIG. 4 illustrates schematically how the invention can be applied in a utility plant application. The solid lines show solids flow and the dashed lines show steam flow. The alternate dash-dot line refers to liquid.

Boiler feed water, preheated in an economizer (not shown), is introduced into the integral arrangement of combustor 10 and fluid bed heat exchanger 34 by line 74 to generate steam. The heat of combustion is transferred in part to the feed water to generate a steam. Steam 76 passes through a convective pass (not shown) and then through compartment 38A of heat exchanger 34 where the steam is superheated. The superheated steam 78 enters high pressure turbine 80. The steam exhausted from turbine 80 is dissipated as steam 82 which then enters reheat section 38B. Steam is then reheated to form a reheated steam 84 and passes into low pressure turbine 86.

Solids are diverted to compartments 38A and 38B in an amount to provide sufficient thermal energy to the respective compartments as described previously.

Figures 5, 6:
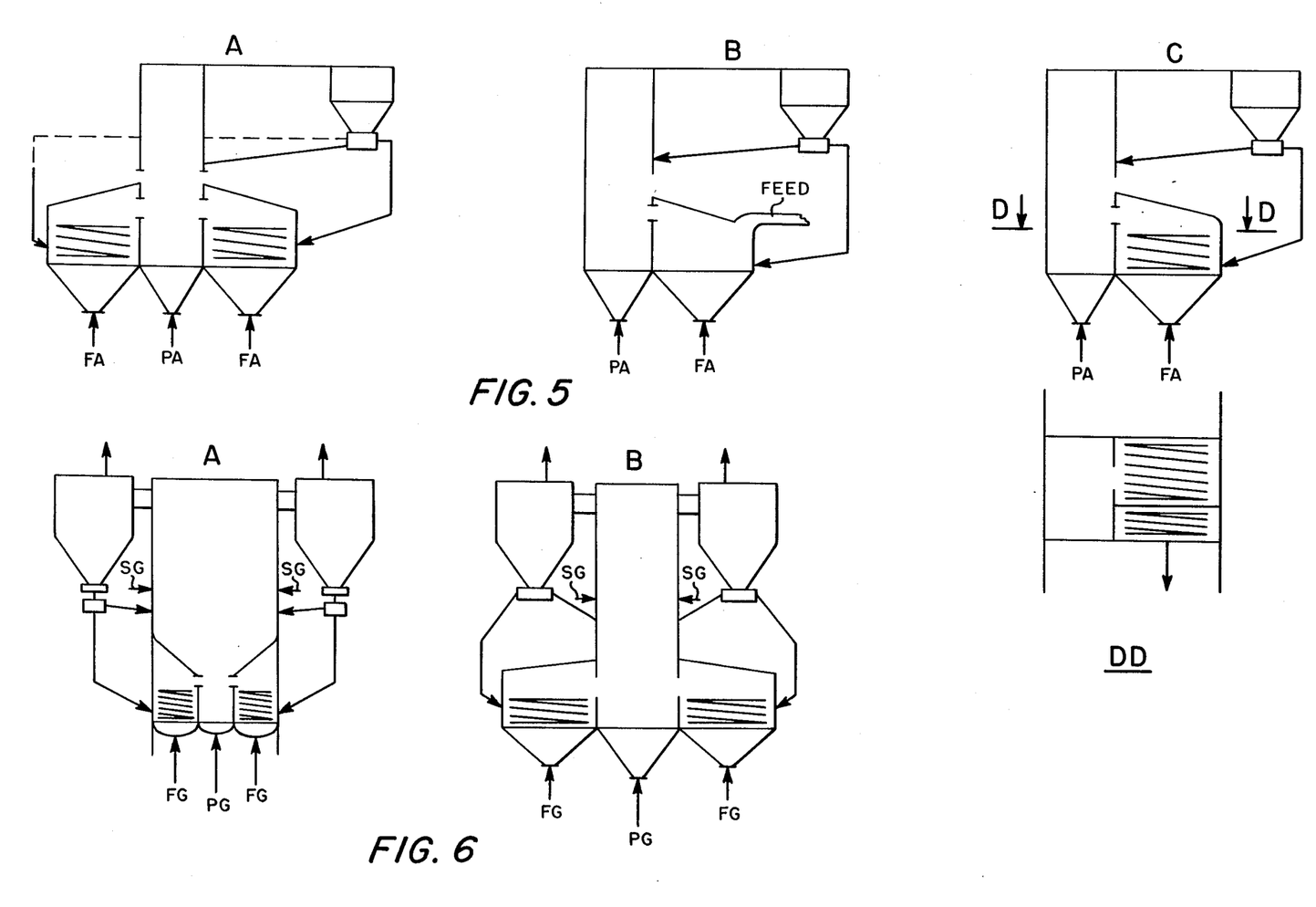

FIG. 5 generally depicts a number of additional embodiments of the present invention. FIG. 5A shows an arrangement whereby two fluidized bed heat exchangers are utilized each heat exchanger being on opposite sides of the reactor.

FIG. 5B shows an arrangement whereby the fuel feed and/or sorbent can be dried or preheated in the fluid bed heat exchanger.

FIG. 5C with view DD shows one arrangement whereby heat exchanger 34 can be separated into a number of compartments one of which is used for ash cooling.

FIGS. 6A and 6B illustrate an alternate arrangement whereby multiple solids separators are used to further provide independent control for each heat duty in the integral fluidized bed heat exchanger. FIG. 6A also shows that the heat exchanger can be formed in part from an inward deformation of the lower reactor wall.

The following Examples will serve to illustrate the invention.

EXAMPLE 1

Solid fuel (petroleum coke), in an amount of 41,080 lbs. per hour having a carbon content of 80.96% with 6.07% sulfur and having a high heating value of 13,432 BTU/lb is fed into a fluid bed reactor having a bottom area of approximately 240 ft. square by 80 ft. high. The fuel has a maximum particle diameter of $\frac{1}{4}$ in. Primary air, in an amount of 213,755 lbs. per hour, preheated to a temperature of 402° F. at 72 inches water gage (w.g.), is fed into the reactor through a grate and nozzle distribution system. Secondary air at 402° F., 35" w.g. is fed into the reactor at a rate of 258,747 lbs. per hour above the fuel introduction points. Limestone, at a rate of to 10650 lbs. per hour, is introduced into the reactor for capture of sulfur oxides. The exhausted flue gas is at a temperature of approximately 1630° F. Based on a recirculation rate of about $2.86 \times 10^6$ lbs/hr., the reactor has a mean suspension density of about 40 kg per $m^3$ above the secondary air inlet. Approximately $2.86 \times 10^6$ lbs/hr. of solids are introduced into the separating cyclones on an hourly basis, and all but 20,500 lbs/hr. of solids are separated therein. The separated solids are at a temperature of approximately 1600° F.

The fluid bed heat exchanger (FBHE) 34 receives $1.1 \times 10^6$ lbs. per hour of hot solids. Fluidizing air, at a rate of 38,190 lbs. per hour, is made available at 160° F. and 170 inches water gage and is introduced into integral FBHE 34. Approximately 1,075 lbs. per hour of excess solids at a temperature of about 1200° F. is withdrawn from the FBHE and further cooled before transfered to an ash silo. The remainder of the solids in heat exchanger 34 is fed through the perforations into reactor 10. The perforations are located at a height of about 7 ft. above the reactor grate and have a total open area of about 8 $ft^2$. Solids are also intermittently removed from the bed of reactor 10 at a temperature of about 1600° F. The fluidizing air in heat exchanger 34 is heated therein to approximately 1200° F. and passes into the reactor 10 along with the solids via the perforated wall separating the reactor and integral fluid bed heat exchanger. Cooling media in the form of saturated steam passes through the tube bundles in heat exchanger 34 at a rate of 450,000 lbs. per hour and 1005° F. at the exit of the bundles. The reactor bed temperature is maintained at about 1600° F.

The total amount of heat transfered from the solids to the steam in FBHE 34 is about $110 \times 10^6$ BTU/hr. The process results in 450,000 lbs. per hour of superheated steam at 1005° F. 1890 psig.

EXAMPLE 2

Solid fuel (lignite), in an amount of approximately 241,165 lbs. per hour having a carbon content of 38.6% with 0.9% sulfur and having a high heating value of 6733 BTU/lb is fed into a fluid bed reactor having a bottom area of about 900 square ft. by 100 ft. high. The fuel has a maximum particle diameter of ⅜ in. Primary air, in an amount of 589,600 lbs. per hour, preheated to a temperature of 467° F. at 88" w.g., is fed into the reactor through a grate and nozzle distribution system. Secondary air at 467° F., 48" w.g. is fed into the reactor at a rate of 779,150 lbs. per hour above the fuel introduction points. Limestone, at a rate of to 5265 lbs. per hour, is introduced into the reactor for capture of sulfur oxides. The exhausted flue gas is at a temperature of approximately 1610° F. Based on a recirculation rate of about $5.8 \times 10^6$ lbs/hr., the reactor has a mean suspension density of about 45 kg per m$^3$ above the secondary air inlet. Approximately $5.8 \times 10^6$ lbs/hr. of solids are introduced into the separating cyclones on an hourly basis, and all but 60,000 lbs. of solid particulate is separated therein. The separated solids are at a temperature of approximately 1560° F.

FBHE 34 receives about $3 \times 10^6$ lbs per hour of recycle solids. Fluidizing air, at a rate of 65,350 lbs. per hour, is made available at 160° F. and 185 inches water gage and is introduced into the FBHE 34. Approximately 3000 lbs. per hour of excess solids at a temperature of about 1175° F. is withdrawn from the FBHE and further cooled before transferred to an ash silo. The remainder of the solids in FBHE 34 is fed through the perforations into reactor 10. The FBHE consists of two compartments: one compartment (38A) contains superheat surface, the second compartment (38B) contains reheat surface. Each section consists of two compartments. The wall and partitions of the FBHE are made of water walls. The evaporative duty achieved in the FBHE water walls is $45 \times 10^6$ BTU/hr. The superheat duty is about $130 \times 10^6$ BTU/hr. and the reheat duty is about $200 \times 10^6$ BTU/hr. Solids at 1560° F. enter the compartment 38A at a rate of about $1.0 \times 10^6$ lb/hr. and in the compartment 38B at a rate of about $2 \times 10^6$ lb/hr. in the reheat unit, and are returned into the reactor 10 at 1175° F. The process results in 1,100,000 lb/hr. superheated steam at 1005° F., 2005 psig and 987,493 lbs/hr. reheated steam at 1005° F., 397 psig. The FBHE perforations are located at a height of 7 ft. above the reactor grate and have a total open area of 17 ft$^2$. Solids are also intermittently removed from the bed of reactor 10 at a temperature of about 1560° F. The fluidizing air in FBHE 34 is heated therein to approximately 1175° F. and passes into the reactor 10 along with the solids via the perforated wall separating the reactor and integral fluid bed. Cooling media in respective compartments 38A and 38B in the form of water, superheated steam and reheated steam passes through the tube bundles in FBHE 34. The total amount of heat transfered from the solids to the cooling media is $375 \times 10^6$ BTU/hr.

To adjust the system to obtain part load operation the fuel feed rate and combustion air flow are reduced proportionately. The solids recycle rate will also be reduced and the control valve will modulate solids flow to the FBHE so as to satisfy the new steam demand.

At part load operation, i.e., 75% of full load, the fresh steam generation rate will be reduced to about 825,000 lb/hr and the flow of reheat steam to about 740,600 lb/hr.

The fuel feed flow will be reduced to about 181,000 lb/hr. The primary and secondary air flows will be reduced proportionally to maintain constant excess air, while the air flow for fluidization of the fluid bed heat exchanger remains constant. Because of the reduced gas flow in reactor 10, the solids recirculation rate will also be reduced to approximately $4.0 \times 10^6$ lb/hr. Approximately $1.5 \times 10^6$ lb/hr of the recirculated solids will be passed via the reheat section of the FBHE in order to maintain constant temperature (1005° F.) at the exit of the steam reheater. The solids flow rate through the reheat compartment 38B of the internal FBHE will be controlled via the solids extraction valve 67 as function of the reheat exit temperature.

Approximately $0.75 \times 10^6$ lb/hr of the recirculated solids will be passed via the superheat compartment 38A of the FBHE in order to control constant combustion temperature in reactor 10. Final control of steam superheat temperature will be achieved by spray desuperheating.

It will be understood that the specification and examples are illustrative but not limitative of the present invention and that other embodiments within the spirit and scope of the invention will suggest themselves to those skilled in the art.

We claim:

1. An energy producing plant comprising:
  a circulating fluidized bed system including a fluidized bed reactor having a chamber with heat transfer means comprising at least one reactor water wall, at least one solids separator and recycle leg, said reactor having a first inlet means for introducing a first fluidizing gas therein and at least one second inlet means for introducing a secondary gas containing oxygen enabling a staged and near stoichiometric combustion of a fuel;
  means adapted to transfer at least a portion of the solids removed in the solids separator into a second chamber positioned above said first inlet means, said second chamber having a common wall with the fluidized bed reactor between first and second inlet means of the reactor and forming an integral unit with said reactor, said second chamber having gas inlet means and a means for maintaining a gas therein at a pressure so that gas passes into the reactor with solids from said second chamber, said second chamber having at least one water wall, said least one water wall being in fluid communication with said least one water wall of the reactor;
  means to control the relative amount of solids fed into the second chamber; and
  means adapted to transfer the remaining portion of the solids removed in the separator directly into said reactor.

2. The plant of claim 1, wherein said solids chamber is positioned between said first and second inlet means of the said reactor.

3. The plant of claim 1 wherein said common wall has at least one perforation for fluid communication between the reactor and second chamber and is adapted with means by which the wall can be cooled.

4. The plant of claim 1 wherein said second chamber has a plurality of compartments, each compartment being in fluid communication with said chamber and each compartment having its own heat transfer means therein.

5. The plant of claim 4 further comprising means to control the relative amount of solids fed into each compartment.

6. The plant of claim 3 wherein the least one perforation has a lower boundary, and solids introduced into said second chamber form a bed having a depth which substantially corresponds with the lower boundary.

7. The plant of claim 1 wherein said second chamber has a plurality of compartments and further comprises means to feed fuel and/or limestone to one of said plurality of compartments for preconditioning prior to its introduction into said reactor.

8. The plant of claim 1 further comprising a third chamber separate from said second chamber said third chamber housing heat transfer means and having a common wall with said reactor wherein said common wall is formed with at least one perforation, said third chamber being adapted to receive solids from said separator independent of said second chamber.

9. The plant of claim 4 wherein the heat transfer means in said compartments are a superheater and reheater, the plant further comprising means for directing superheated steam to a high pressure turbine.

10. The plant of claim 11 further comprising means for directing the steam exhausted from said high pressure turbine to the reheater wherein the steam is reheated and means for directing the reheated steam to a second turbine.

11. The plant of claim 1 wherein the reactor fluid bed chamber is upright and vertically elongated,
with the first inlet means at the bottom thereof,
means for introducing material into a lower portion of said fluid bed chamber,
the second inlet means for introducing a secondary gas into said fluid bed chamber is at least one meter above said first inlet means and at a level lying above said bottom by up to substantially 30% of the total height of said fluid bed chamber,
discharge means for removing a flue gas with entrained solid particles from said fluid bed chamber;
heat transfer means are conduits for the circulation of a heat transfer medium in a space of said fluid bed chamber above said second inlet means, said chamber having a substantially unobstructed space below said second inlet means;
the separator is connected to said discharge means for removing said solid particles from said flue gas; and
the recycle leg adapted to recycle at least a portion of the removed particles to a re-entry port at a lower part of said space.

12. A process for controlling temperature in a reactor of a circulating fluidized bed system comprising collecting entrained solids from a flue gas of the reactor;
measuring a process variable and in dependence thereon directing at least a portion of the collected solids into a second chamber and recycling any remaining portion of the solids into the reactor, said second chamber housing heat transfer means and having a wall section common to said second chamber and said reactor, said common wall having at least one perforation therein adapted for fluid communication between said second chamber and said reactor;
fluidizing said solids in said second chamber to operate under conventional or bubbling bed conditions with a relatively high pressure fluidizing gas;
maintaining the pressure of the high pressure fluidizing gas in said second chamber at a pressure higher than that in the reactor to cause said fluidizing gas and solids to flow through said least one perforation to control the operating temperature in the reactor.

13. The process of claim 12 wherein the flow of solids into said second chamber is controlled as a function of the flue gas temperature from the reactor or separator.

14. The process of claim 13, wherein the fluidizing gas in the second chamber is introduced therefrom into said reactor and serves as secondary gas.

15. The process of claim 12 wherein the second chamber has a plurality of compartments and the separated solids are introduced into a first compartment and fuel and/or limestone is introduced into a second compartment for preheating and/or predrying prior to the introduction of the fuel and/or limestone into the reactor.

16. The process of claim 12 wherein the second chamber has separate heat transfer means for evaporation and superheat and each heat transfer means is separately controlled.

17. The process of claim 12 further comprising introducing a portion of the separated solids into a third chamber having a perforated wall common with said reactor; said third chamber being operated as a bubbling bed and having its own heat transfer means.

18. The process of claim 12 wherein a heat transfer medium flows through said heat transfer means in said second chamber.

19. The process of claim 18 wherein the heat transfer medium is water, air, gas, liquid, oil, or a salt melt.

20. The process of claim 12 wherein a heat transfer medium passes through said heat transfer means, the medium temperature is measured subsequently to its passage through said heat transfer means and the collected solids are directed in dependence therein.

21. The process of claim 20, wherein the fluidizing gas in the second chamber is introduced therefrom into said reactor and serves as secondary gas.

22. A process for controlling bed temperature of a circulating fluidized bed in a fluidized bed reactor comprising:
introducing carbonaceous material into a fluid bed in an upright reactor;
fluidizing the carbonaceous material in said fluid bed with a primary fluidizing gas introduced at the bottom of said bed, introducing a secondary gas into said fluid bed at a level above that at which the primary gas is introduced and above the bottom of the fluid bed, at least the secondary gas containing oxygen;
burning the carbonaceous material with the oxygen;
separating solids from a gas effluent from said bed to collect solid particles;
measuring the temperature of the gas effluent and in dependence therein controlling the relative amount of solids fed into a second chamber;
said second chamber housing heat transfer means and having a wall section common to said second chamber and said reactor, said common wall having at least one perforation therein adapted for fluid communication between said second chamber and said reactor;
fluidizing said solids in said second chamber to operate under bubbling bed conditions with a high pressure fluidizing gas; and maintaining the pressure of the higher pressure fluidizing gas in said second chamber at a pressure higher than that in the reactor to cause said fluidizing gas and solids to flow through said perforation thereby controlling the temperature of the bed in the reactor.

23. The process of claim 22, wherein heat is transferred through heat transfer surfaces in contact with the solids of the fluidized bed above the introduction of the secondary gas.

24. The plant of claim 1 wherein said second chamber houses a tube bundle as a heat transfer means.

* * * * *

UNITED STATES PATENT AND TRADEMARK OFFICE
CERTIFICATE OF CORRECTION

PATENT NO. : 4,716,856
DATED : January 5, 1988
INVENTOR(S) : Hans Beisswenger et al It is certified that error appears in the above-identified patent and that said Letters Patent is hereby corrected as shown below:

Column 2, line 53, the right side of the equation should read $$-- \frac{\rho_g}{\rho_K - \rho_g} < 10 --$$

and "L 1 pg" should be deleted.

Column 13, line 24, "11" should read --9--.

Column 15, line 1, "higher" should read --high--.

Signed and Sealed this

Twenty-second Day of May, 1990

Attest:

HARRY F. MANBECK, JR.

*Attesting Officer*  *Commissioner of Patents and Trademarks*